Figure 1:
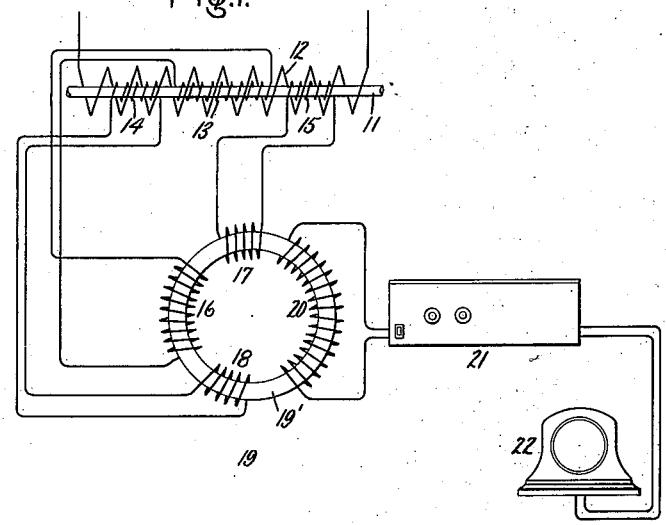

July 9, 1935.   J. A. SAMS ET AL   2,007,772
MAGNETIC TESTING APPARATUS
Filed Dec. 24, 1931

Inventors:
James A. Sams,
Charles D. Moriarty,
by Charles E. Mullar
Their Attorney.

Patented July 9, 1935

2,007,772

UNITED STATES PATENT OFFICE 2,007,772

MAGNETIC TESTING APPARATUS

James A. Sams, Schenectady, and Charles D. Moriarty, Utica, N. Y., assignors to General Electric Company, a corporation of New York Application December 24, 1931, Serial No. 582,992

6 Claims. (Cl. 175—183)

Our invention relates to magnetic testing devices and concerns particularly non-destructive methods and apparatus for locating defects in magnetic material.

It is characteristic of magnetic material such as iron that when a core composed of the material is subjected to a sinusoidal magnetomotive force there will be set up in a winding surrounding the core, secondary currents having a distorted wave form. This distortion results from the setting up in the flux wave of various harmonics of the magnetomotive force wave in addition to the fundamental. The magnitude of each component of the flux wave in any portion of the core depends upon the characteristics of the material composing that part of the core; chemical composition, hardness, permeability, various physical properties, and mechanical defects as well as upon the cross-sectional area of the core. Each tends to accentuate certain harmonics, and variations in properties will produce variations in the flux wave along the length of the test specimen used as a core. Having determined which harmonics correspond to the particular property of the material, it is possible by balancing out the other harmonics with external electromotive forces to discover the existence and location of variations in such a property by arranging a device responsive to variations in a predetermined harmonic. However, devices for balancing out harmonics are complicated and difficult to maintain in adjustment.

It is an object of our invention to provide a testing device and method which is responsive to the space variations in the flux caused by mechanical flaws in the test specimen, but which is inherently unresponsive to the other harmonics. It is a further object to provide a testing device and method responsive to a desired harmonic of the flux variations but unresponsive to others. Other objects and advantages will become apparent as the description proceeds.

Variations in permeability, hardness, and other physical characteristics, variations in chemical composition, and also relatively gradual changes in dimensions such as ordinary variations in thickness of the material since they occur gradually, tend to give rise only to inappreciable differences in magnitude of the harmonics along a relatively short length of the test object. On the other hand, mechanical defects such as cracks, fissures, or other flaws, although very minute and not apparent by visual inspection from the exterior of the material to be tested, obviously being abrupt, will cause abrupt changes in the magnitude of the flux wave, particularly the third harmonic, in the immediate vicinity of the fault. In accordance with our invention when testing for mechanical flaws we subject the object to be tested to a substantially sinusoidal magnetomotive force, as nearly uniform as possible along a portion of the length of the test object. We then employ relatively short closely adjacent normally balanced exploring coils placed in the uniform portion of the field to detect the existence and location of flaws in the test object.

Figure 2:
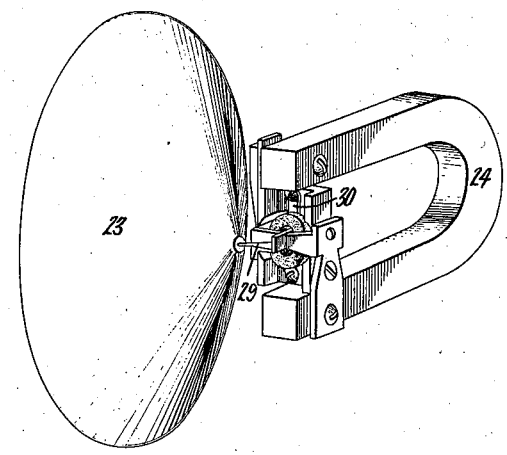
Figure 3:
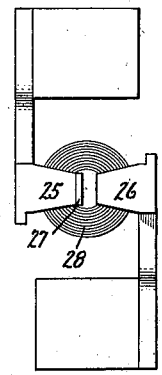

The features of our invention which we believe to be novel and patentable will be set forth with particularity in the claims appended hereto. Our invention itself however, will be best understood by referring to the following specification taken in connection with the accompanying drawing in which Fig. 1 represents schematically the apparatus employed in an embodiment of our testing device; Fig. 2 is a perspective view of an acoustical indicating device which may be used in connection with the apparatus; and Fig. 3 is a front elevation of the magnetic assembly of the acoustical device.

Referring to the drawing, we have represented at 11 a strip of magnetic material placed in an apparatus for detecting mechanical faults therein. We have shown the test piece in the form of a strip, but it will be understood that our invention is not limited to testing objects of a particular form although it is particularly well adapted to testing continuous bars, tubing, sheets and the like. The strip or test piece 11 is surrounded by a winding 12 preferably of sufficient length to insure the existence of a uniform magnetic field along the center portion of the winding 12. The winding 12 is supplied with alternating current of any available frequency, for example, a commercial frequency such as 60 cycles. The test piece 11 is also surrounded by a set of exploring or detecting coils 13, 14 and 15, preferably placed between the test piece 11 and the field producing winding 12.

The detecting coils 13, 14 and 15 are so connected and the relative numbers of turns are so chosen that coil 13 acts in opposition to coils 14 and 15, and the coils are balanced when in a uniform magnetic field. This arrangement of interleaved detecting coils in which one detecting coil is placed between what may be regarded as the split portions of an opposing detecting coil has the advantage of reducing to a minimum undesired inductive effects from other electrical machinery or from uniformly increasing or decreasing flux densities along the test piece caused by gradual changes in thickness, permeability, etc. It will be understood however that we are not limited to this exact arrangement of the opposed detecting coils.

Since it is essential to obtain an exact balance of the opposing coils we prefer to employ an auxiliary balancing arrangement comprising movable coils 16, 17 and 18 wound upon a high permeability laminated yoke 19' of a transformer 19. The detecting coils 13, 14 and 15 are each connected in series with coils 16, 17 and 18 respectively of transformer 19, the connections and relative numbers of turns being such that coil 16 acts in opposition to coils 17 and 18 and no flux is induced in the yoke 19' when the detecting coils are in a uniform field. Slight degrees of unbalance may be overcome by adjusting the relative positions of movable coils 16, 17 and 18. It will be understood that, if desired, an inaccuracy in the relative numbers of turns of coils 13, 14 and 15 may be compensated for by a modification of the relative numbers of turns of coils 16, 17 and 18.

Whenever the detecting coils are unbalanced by the occurrence of a flaw in the test piece, the movable coils 16, 17 and 18 will be unbalanced, thereby inducing an alternating flux in the core 19' of transformer 19. A secondary winding 20 is provided in which a voltage is induced whenever flux flows in the core 19', thereby energizing a suitable indicator or signal 22 which is preferably an acoustical device and may be similar to one of the types of loud speakers used in connection with radio reception. It will be understood, however, that we are not limited to any specific type of indicator or signal. The voltage induced in winding 20 of transformer 19 is preferably amplified by a device 21 which may be of any suitable type known in the art.

It will be obvious that the arrangement of this device is such that the operation is independent of variations in voltage of the source used to energize coil 11, or difference between the properties of various materials which it is desired to test.

The detecting coils 13, 14 and 15 are shown as relatively widely spaced and of relatively great length in comparison with the field producing winding 12 for the sake of greater clearness in the drawing. However, in practice we prefer to form the detecting coils 13, 14 and 15 in a compact unit having an axial length as short as practical considerations permit. In the case of apparatus for testing bars the axial length of the group of detecting coils may, for example, be approximately of the same order of magnitude as the diameter of the test piece 11. The detecting coils are placed in the center of the field producing winding 12 where the magnetic field is uniform, that is to say, where its strength varies inappreciably between points separated axially.

The piece to be tested may be inserted in the field producing coil 12 and gradually moved along with respect to the coil until the entire length of the test piece has been passed through the coil. Since the magnetic field within the field producing coil 12 is made uniform and since the length of the set of balanced detecting coils is relatively short, gradual variations in the flux wave which might be caused by ordinary differences in the physical properties or the dimensions of the test piece from one end of the field producing coil to the other, will be without effect upon the detecting coils 13, 14 and 15. If, however, a portion of the test piece having a defect such as a crack or fissure comes under one of the detecting coils, since the dimensions of such a defect are small taken in comparison with the dimensions of the detecting coils, the shape of the flux wave under one of the detecting coils will be different than under the remaining two detecting coil. Consequently, unbalanced voltages will be induced in the detecting coils, causing the signal device 22 to the energized. Since the unbalanced flux caused by the defect in the test piece contains a pronounced third harmonic, the voltage induced in winding 20 of transformer 19 as a result of a flaw in the test piece will also have a pronounced third harmonic, and the sensitivity and selectivity of our device will be increased by using an indicating device accentuating the third harmonic. Accordingly, the amplifier 21 which may be of any suitable type such as a vacuum tube amplifier used in radio reception, and the acoustic device 22, may if desired, be tuned to the third harmonic of the voltage impressed across winding 12 but we have found that very satisfactory results are obtained without especially tuning devices 21 and 22.

When a flaw occurs in a portion of the test piece under the exploring coils, an unbalance is produced and this unbalance though slight is greatly magnified by the amplifier 21 which causes a current to flow in acoustical device 22 which emits a penetrating note that will immediately attract the attention of the operator and be distinguishable from noises such as the sounds of machinery operating in the test room.

Owing to the fact that the coils 13, 14 and 15 are balanced, magnetic waves set up by other electrical machinery such as sparking commutators and the like will have no effect upon our testing device and therefore there will not be any interference from such sources. Furthermore, owing to the fact we use an audible signal instead of a visible signal the operator may direct his entire attention to the manipulation of the test piece and there is no danger that the operator will fail to find a defect because he permitted his eyes to wander from a visual indicating instrument.

We find that a loud speaker of the type disclosed in U. S. Patent 1,824,724 to Kellogg, issued September 22, 1931, may by a slight modification be made to produce a signal of the desired quality. The acoustical device we employ comprises a diaphragm 23 actuated by a magnetic motor comprising a permanent magnet 24 and pole pieces 25 and 26, cooperating with an armature 27 surrounded by a coil 28. One end of the armature 27 is connected to the diaphragm 23 by means of member 29 so that vibrations of the armature 27 force the diaphragm 23 to vibrate in unison. The armature 27 is supported by a spring 30. In the loud speakers as ordinarily constructed, the spring 30 is of such stiffness that the armature 27 is not permitted to strike either of the pole pieces 25 or 26. In the modification which we employ, however, the spring 30 is slightly weakened by reducing its thickness so that the attraction of one of the pole pieces 25 or 26 will cause the armature to strike violently against whichever pole happens to be closer. When the coil 28 is energized and the current reverses in coil 28, the polarity of the armature will be reversed so it will be repelled by the pole piece against which it is resting and violently strike the opposite pole piece. Obviously, this will occur each time the current in coil 28 reverses. The violent impacts of armature 27 again pole pieces 25 and 26 will impart a grating or mechanical quality to the sound emitted by diaphragm 23 so that upon the occurrence of the fault in the test piece the operator's attention will immediately be commanded by a sound which differs in quality from other sounds so that it will be distinguished and noticed even in noisy surroundings. On the other hand, weak currents flowing in coil 28 which might result from unavoidable imperfections in the apparatus or from the inability to balance the detecting coils and windings of transformer 19 with absolute precision will not be sufficient to cause the armature 27 to leave whichever one of the pole pieces 25 or 26 against which it happens to be resting so that no audible sounds will be emitted by the acoustical device 22 unless there is a fault in the test piece under one of the detecting coils. Consequently, the operator's energies are not exhausted by attempting to differentiate between sounds of varying pitch, quality, or intensity which might be emitted by the acoustical device 22 were the above-described expedients not employed.

In some cases, as for example, when our apparatus is used to test sheets of considerable width it may be desirable to bank the field producing winding 12 or to gradually increase the number of turns from the center toward the end in order to obtain a greater uniformity of magnetomotive force along the test piece. In some cases we also find it desirable to insert sheets of magnetic material such as silicon-iron laminations inside the coil 12 so as to form a sheath between the detecting coils and the field producing coil 12.

It will be understood that the greatest sensitivity and selectivity will be obtained by considering all factors which make for the differentiation of variations in the harmonic known to represent a certain property from variations in other harmonics. For example, in the case of detecting mechanical flaws, we preferably not only utilize indicating apparatus tuned to amplify the third harmonic and to exclude other harmonics, but we also arrange the detecting coils as described above to be responsive to abrupt flux variations but virtually astatic with respect to gradual variations along the length of the test piece. In order to detect and locate variations in other characteristics of the test piece the apparatus would obviously be tuned to the proper harmonic and the test coils would be constructed and located to take advantage of the nature and distribution of the property being tested for. In testing for certain characteristics it may also be found to advantage to control within certain limits the magnetizing force or the extent of saturation of the test piece.

In accordance with the provisions of the patent statutes, we have described the principle of operation of our invention, together with the apparatus which we now consider to represent the best embodiment thereof, but we desire to have it understood that the apparatus shown is only illustrative and that the invention may be carried out by other arrangements.

What we claim as new and desire to secure by Letters Patent of the United States, is,—

1. Apparatus for testing an object of magnetizable material comprising a field producing winding in which the object to be tested is placed to form a magnetic core, a detecting coil in inductive relation with said tested object, a pair of detecting coils also in inductive relation with said object and connected in opposition to said first mentioned detecting coil, said detecting coils being normally balanced, and means for detecting an unbalance in said detecting coils caused by the occurrence of a flaw in said tested object.

2. Apparatus for testing an object of magnetizable material comprising means for subjecting the test object to an alternating magnetic field of uniform strength along a portion of said object, opposed normally substantially balanced detecting coils in inductive relation with said tested object in said uniform field, a transformer having movable primary windings respectively connected in series with said detecting coils and having a secondary winding, said primary windings being movable to permit normally balancing the effect in said transformer of the currents induced in said detecting coils, and means energized by said secondary winding responsive to an unbalance in said transformer caused by the occurrence of a flaw in said tested object.

3. Apparatus for testing an object of magnetizable material comprising means for subjecting the test object to an alternating magnetic field of uniform strength along a portion of said object, a set of normally balanced closely adjacent coaxial detecting coils surrounding said portion of the test object, and means responsive to an unbalance in said detecting coils, said set of detecting coils comprising a pair of coils acting together, another coil lying between said first mentioned coils and acting in opposition to them to normally balance their effect.

4. Apparatus for testing an object of magnetizable material comprising means for subjecting the test object to an alternating magnetizing field of uniform strength along a portion of said object, opposed normally balanced interleaved detecting coils in inductive relation with said test object in said uniform field, and electrical means for detecting an unbalance in said detecting coils, said electrical means being tuned to the third harmonic of said magnetizing field for the purpose of making the apparatus sensitive to mechanical defects in the test object and relatively insensitive to other nonuniformities in said test object, the interleaving of the opposing detecting coils serving to facilitate eliminating inductive effects due to characteristics of the tested object other than mechanical defects.

5. Apparatus for testing an object of magnetizable material comprising means for subjecting the test object to an alternating magnetizing field of uniform strength along a portion of said object, normally balanced opposing sets of coaxial detecting coils surrounding said portion of the test object, and means responsive to an unbalance in said detecting coils, said detecting coils being arranged with coils of one set interposed between coils of the other set.

6. Apparatus for testing an object of magnetizable material comprising means for subjecting the test object to an alternating magnetizing field of uniform strength along a portion of said object, opposed normally balanced interleaved detecting coils in inductive relation with said test object in said uniform field, and electrical means tuned to a predetermined harmonic of said magnetizing field for detecting an unbalance in said detecting coils resulting from the existence in the test object of a characteristic giving rise to said harmonic in the flux wave and making the apparatus relatively insensitive to the existence of characteristics giving rise to other harmonics in the flux wave, the interleaving of the opposing detecting coils serving to facilitate eliminating inductive effects due to characteristics of the tested object other than the characteristic being tested for.

JAMES A. SAMS.
CHARLES D. MORIARTY.